May 29, 1945.   B. H. STEWART   2,377,279
LIFT
Filed Feb. 7, 1944    4 Sheets-Sheet 2
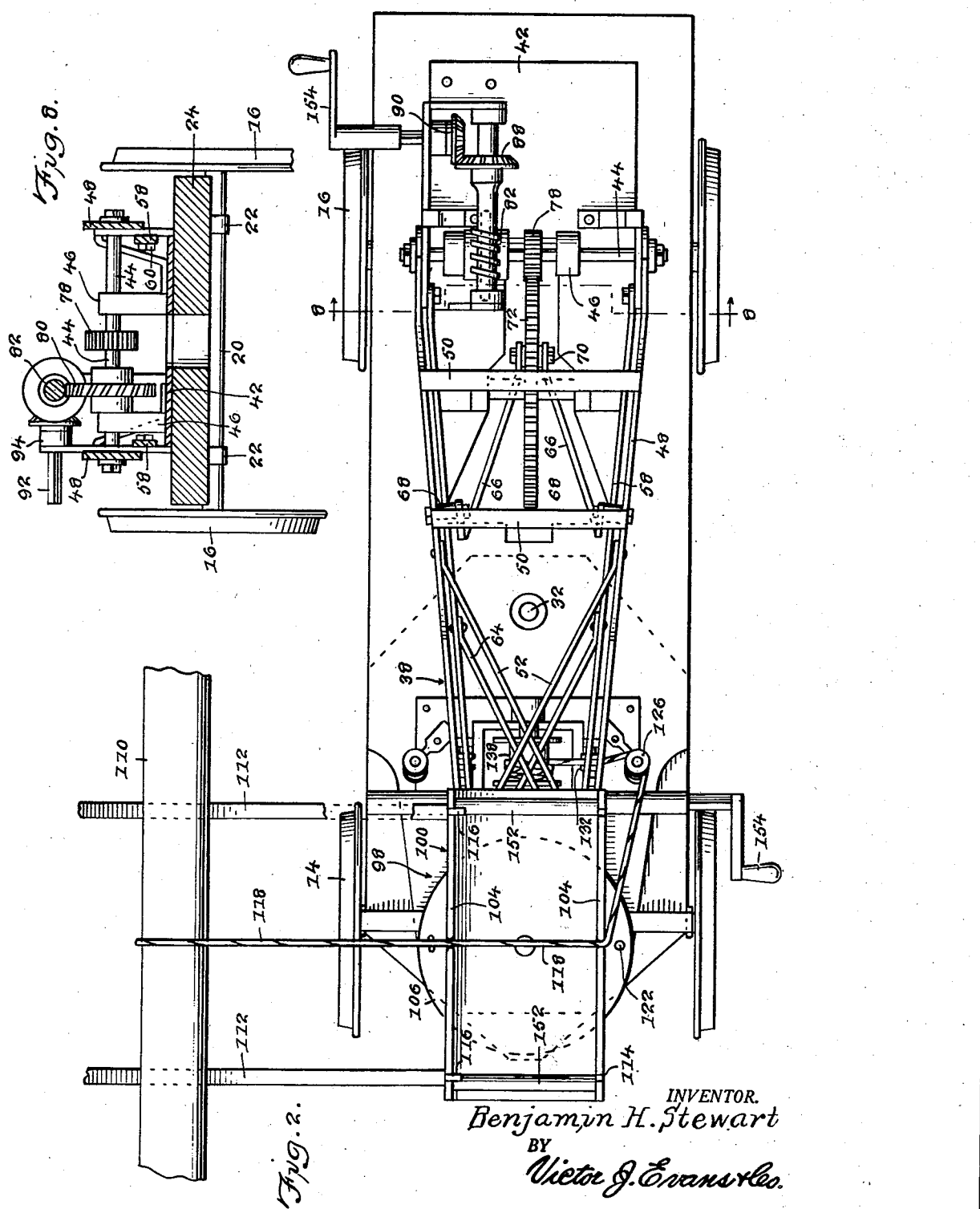
INVENTOR.
Benjamin H. Stewart
BY
Victor J. Evans & Co.
ATTORNEYS May 29, 1945.　　　B. H. STEWART　　　2,377,279
LIFT
Filed Feb. 7, 1944　　　4 Sheets-Sheet 3
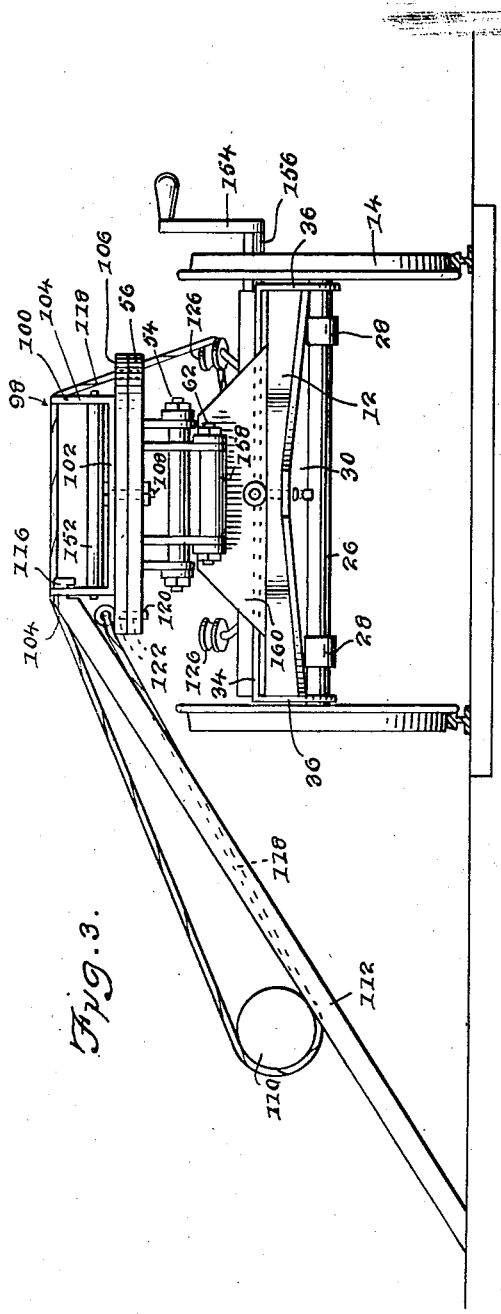
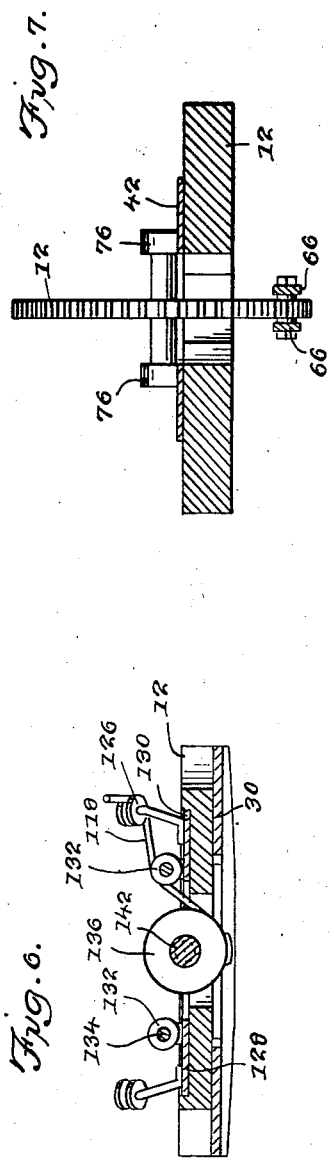
INVENTOR.
Benjamin H. Stewart
BY
Victor J. Evans & Co.
ATTORNEYS May 29, 1945.　　　B. H. STEWART　　　2,377,279
LIFT
Filed Feb. 7, 1944　　　4 Sheets-Sheet 4
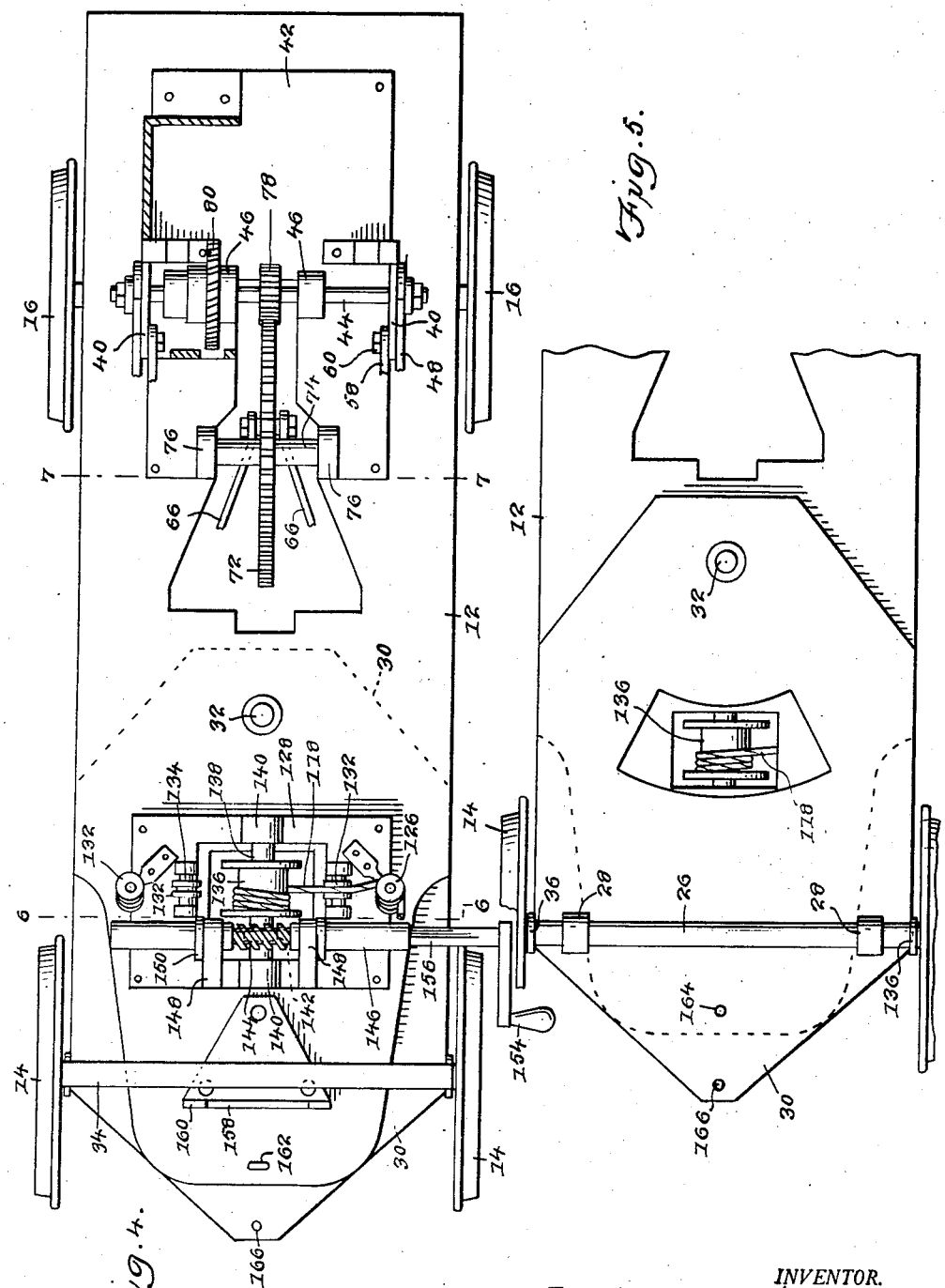
INVENTOR.
Benjamin H. Stewart
BY
Victor J. Evans & Co.
ATTORNEYS Patented May 29, 1945

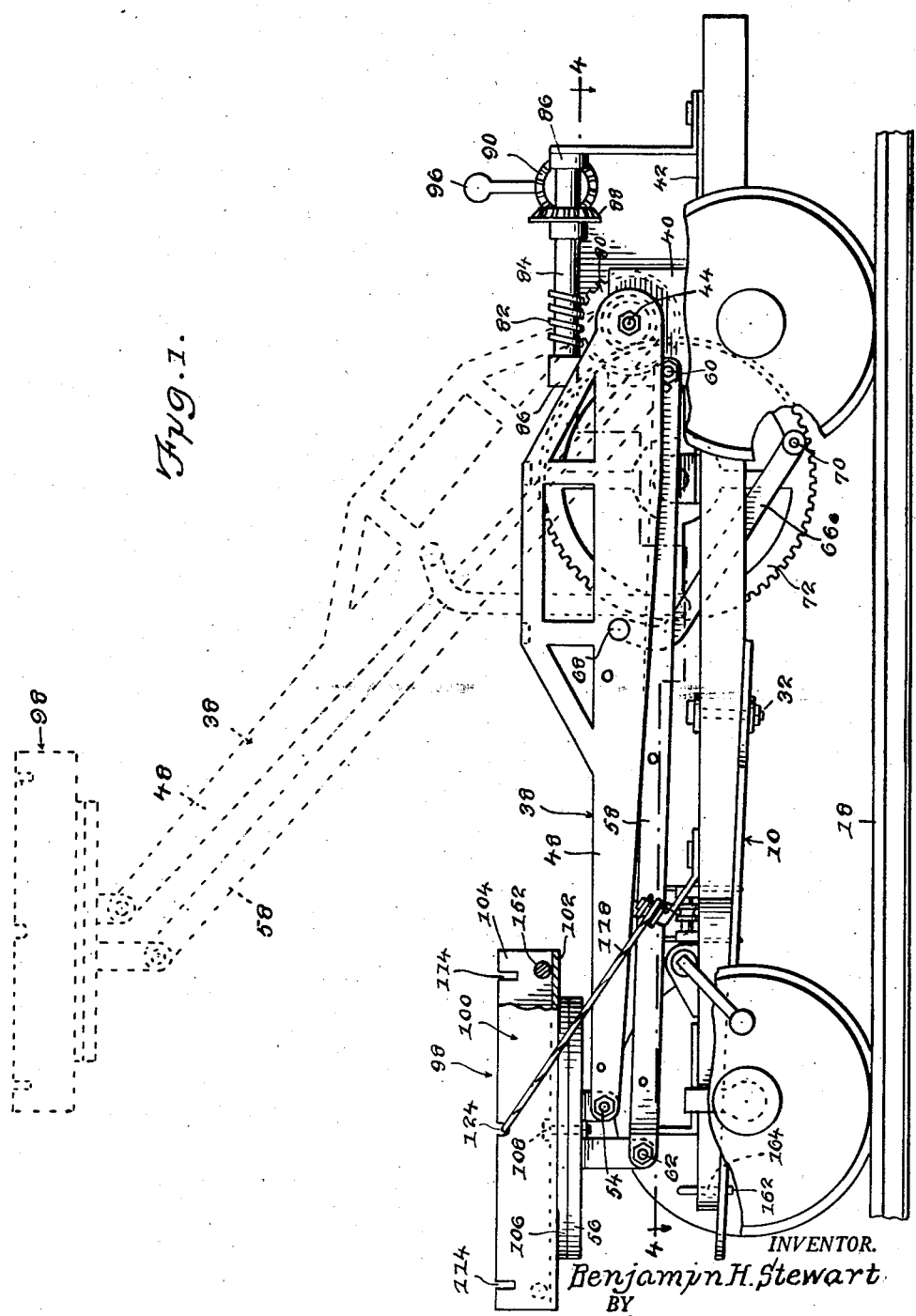

2,377,279

UNITED STATES PATENT OFFICE 2,377,279

LIFT

Benjamin H. Stewart, Christopher, Ill.

Application February 7, 1944, Serial No. 521,414

6 Claims. (Cl. 214—85)

My invention relates to the handling of heavy timbers, beams and similar devices, particularly in coal and ore mines and tunnels, and has among its objects and advantages the provision of an improved lift designed to facilitate elevation of the members to positions adjacent the ceiling structure of the installation.

In the accompanying drawings:

Figure 1 is a side view of the invention, partly in section.

Figure 2 is a top plan view.

Figure 3 is a front elevational view.

Figure 4 is a plan view of a truck bed.

Figure 5 is a bottom plan view of a part of the truck bed.

Figure 6 is a sectional view taken along the line 6—6 of Figure 4.

Figure 7 is a sectional view taken along the line 7—7 of Figure 4, and

Figure 8 is a sectional view taken along the line 8—8 of Figure 2.

In the embodiment of the invention selected for illustration, I make use of a truck unit 10, which comprises a bed 12 and front and rear flanged wheels 14 and 16, respectively, arranged to run on rails 18. These wheels are of such gauge as to operate on mine tracks. The rear wheels 16 are attached to an axle 20 rotatably supported in bearings 22 attached to the bed 24.

The front wheels 14 are fixed to an axle 26 rotatably supported in bearings 28 attached to a bed plate 30 lying underneath the bed 12 and pivotally connected at 32 with the bed 12 at a point intermediate the front and rear wheels 14 and 16. The pivot 32 is located medially of the bed 12. Thus the bed plate 30 is pivotally connected with the bed 12 to permit the front wheel assembly to pivot about the axis of the pin 32 relatively to the rear wheels when negotiating a bend in the track. However, the bed 12 is of such length as to extend beyond the front axle 26 so that the load carried by the bed 12 is also carried by both front and rear axles, the bed plate 30 serving principally as a means for pivotally relating the front wheels 14 to the bed 12. A bar 34 extends across the bed 12 and has downturned ends 36 mounted on the front axle 26 to provide a tie between the bed and the bed plate. This tie permits the bed to pivot freely relatively to the bed plate but restrains the bed plate from separation with respect to the bed 12. This bar prevents the front wheels from being thrown out of place in case of derailment, in addition to providing protection for the bed and the bed plate, particularly buckling of the latter in case of a jam.

Upon the bed 12 is mounted a hoisting unit 38. This unit comprises upstanding flanges 40 mounted on the bed 12 through the medium of a plate 42 bolted to the bed, the flanges comprising bent portions of the plate.

A shaft 44 is rotatably journaled in the flanges 40 and is additionally supported in bearings 46 mounted on the plate 42. The shaft 44 extends beyond the flanges 40 to serve as a pivot for hoist arms 48 having their rear ends pivotally mounted on the shaft. These arms are connected into a unitary frame structure through the medium of cross and diagonal braces 50 and 52, respectively. The forward ends of the arms 48 are pivotally connected at 54 with a turntable bed 56 located above the front wheels 14 when the arms 38 are in the normally lowered positions of Figure 1.

Second arms 58 are pivotally connected at 60 with the flanges 40 and at 62 with the turntable bed 56. The arms 48 and 58 lie in parallelism in all positions of the hoist unit, since the pivots 60 and the shaft 44 are so arranged with respect to the pivots 54 and 60 that the arms 48 and 58 operate as elements of a parallelogram linkage. Thus the turntable bed 56 will be maintained horizontally in all angular positions of the hoisting unit. Diagonal reinforcing braces 64 are provided for connecting the arms 58 into the form of a second frame.

Means for elevating the hoist unit 38 comprise links 66 pivotally conneced at 68 with the arms 48. The other ends of the links 66 are pivotally connected at 70 with a large gear 72, the pivot 70 being located closely to the periphery of the gear. A shaft 74 is rotatably supported in bearings 76 mounted on the plate 42, the gear being fixed to the shaft and meshing with a pinion 78 fixed to the shaft 44.

A worm gear 80 is fixed to the shaft 44 and meshes with a worm 82 on a shaft 84 rotatably supported in bearings 86 mounted on the plate 42. A bevel gear 88 is fixed to the shaft 84 and meshes with a bevel gear 90 fixed to a shaft 92 rotatably supported in a bearing 94 mounted on the plate 42. The shaft 92 is formed with a square end for the reception of a hand operated crank 96 which may be utilized for operating the gear train when raising and lowering the hoist unit 38.

Upon the turntable bed 56 is mounted a turntable 98, which comprises a saddle 100. This saddle includes a bottom 102 and spaced side walls 104, this bottom and the side walls providing a trough into which logs, timbers and other structural members may be loaded for hoisting purposes. A plate 106 is attached to the bottom 102, this plate being pivotally connected with the turntable bed 56 by a bolt 108.

Figure 2 illustrates a log 110 in the process of being loaded on the turntable 98. The structural member may be loaded from either side of the device. In any event, skids 112 are rested on the ground surface and are inclined upwardly to carry the structural member over the wall 104 on the loading side. Both walls are provided with two slots 114, and the skids 112 are provided with end hooks 116 shaped to drop freely in the slots 114 so that the skids may be effectively connected with either side wall.

In Figures 2 and 3, a hoist rope 118 is looped about the log 110, and one end of the rope is provided with a pin 120 which passes easily through aligned openings 122 in the plate 106 and the turntable bed 56. These openings are arranged on diametrically opposite sides of the plate 106 so that one end of the rope 118 may be attached to the plate 106 closely adjacent the wall 104 on the loading side of the turntable. The structural members may be loaded equally well from either side.

The upper stretch of the rope 118 is placed in slots 124 in the upper edges of the walls 104, these slots being located directly over the center of the turntable. This stretch of the rope is passed around one of two grooved guide wheels 126 mounted on a frame 128 anchored to the bed 12 by lying in a recess 130 in the upper face of the bed. Flanged guide rollers 132 are rotatably and slidably mounted on horizontal shafts 134 mounted on the frame 128, and the upper stretch of the rope is attached to a windup spool 136.

The spool 136 is fixed to a shaft 138 rotatably supported in bearings 140 on the frame 128. A worm 142 is formed on the shaft 138 for coaction with a worm 144 on a shaft 146 rotatably mounted in bearings 148 on the frame 128. The shaft 138 is located on the longitudinal center of the bed 12, and the shaft 146 is arranged at right angles to the shaft 138 and is restrained from longitudinal movement by collars 150.

Horizontal rollers 152 are mounted on the walls 104 so that the structural member may be shifted longitudinally on the turntable 98. The structural member is moved along the skids 112 through rotation of the spool 136, which rotation is consummated through the medium of a crank 154 detachably connected with the square end 156 on the shaft 146. The turntable 98 is restrained from accidental rotation by reason of the pin 120, and the rope 118 passes over the center of the turntable and will lift from the turntable to permit the structural member to slide or roll into the trough and onto the rollers 152.

With the hoist unit 38 in its lowered position of Figure 1, the arms 58 lie in a recess 158 in a bracket 160 attached to the bed 12. This bracket restrains the hoist unit from lateral deflection incident to any side pull transmitted to the hoist unit, as when loading heavy structural members. A pin 162 may be inserted through openings 164 in the bed 12 and the bed plate 30 so as to fixedly latch these two members for additional rigidity.

The bed plate 30 is provided with an opening 166 in its forward end for connection with a suitable pulling device in cases where power may be necessary to move the loaded truck structure.

The rope 118 is easily operated at either side of the device, and the turntable 98 rotates freely after disconnection of the rope 118 so that the structural member may be easily placed in proper alignment when elevated to the tunnel ceiling or other construction project.

Without further elaboration, the foregoing will so fully explain my invention, that others may, by applying current knowledge, readily adapt the same for use under various conditions of service.

I claim:

1. A lift comprising a portable truck, a structural member supporting turntable, arm means pivotally mounted on said truck and with said turntable to elevate the latter, means for elevating the arms, skids coacting with said turntable to guide the structural member onto the turntable, flexible means adapted to be looped about the structural member and connected at one end with said turntable, and a pull means connected with the other end of said flexible means for moving the structural member along said skids and onto the turntable.

2. A lift comprising a portable truck, a structural member supporting turntable, arm means pivotally mounted on said truck and said turntable to elevate the latter, means for elevating the arms wherein said last mentioned means includes links pivotally connected with said arm means, a large gear having the other ends of said links pivotally connected therewith, a rotative pinion meshing with said gear, and manually actuated means for rotating said pinion, said manually actuating means including meshing worm and worm gears.

3. A lift comprising a portable truck, a structural member supporting turntable, arm means pivotally mounted on said truck and said turntable to elevate the latter, means for elevating the arms wherein said truck includes a bed on which said arm means are mounted, a bed plate underlying said bed and pivotally connected therewith, first wheels supported on said bed, and second wheels supported on said bed plate.

4. A lift comprising a portable truck, a structural member supporting turntable, arm means pivotally mounted on said truck and said turntable to elevate the latter means for elevating the arms wherein said truck includes a bed on which said arm means are mounted, a bed plate underlying said bed and pivotally connected therewith, first wheels supported on said bed, second wheels supported on said bed plate, and means for keying said bed and said bed plate against relative movement.

5. A lift comprising a portable truck, a structural member supporting turntable, arm means pivotally mounted on said truck and said turntable to elevate the latter, means for elevating the arms wherein a rotative spool is mounted on said truck, a flexible member adapted to be looped about the structural member and having means at one end for connection with the turntable, guides for the other end of said flexible member, said flexible member being connected with said spool, and means for imparting rotation to the spool.

6. A lift comprising a portable truck, a structural member supporting turntable, arms pivotally mounted on said truck and with said turntable to elevate the arms, a gear mounted on the pivot of one of the arms, and means for rotating said gear in either direction, whereby the turntable is lowered or raised.

BENJAMIN H. STEWART.